US012347966B2

(12) United States Patent
Van Besouw

(10) Patent No.: US 12,347,966 B2
(45) Date of Patent: Jul. 1, 2025

(54) DEADBREAK CONNECTOR

(71) Applicant: Hubbell Incorporated, Shelton, CT (US)

(72) Inventor: Bastiaan Van Besouw, Strongsville, OH (US)

(73) Assignee: Hubbell Incorporated, Shelton, CT (US)

( * ) Notice: Subject to any disclaimer, the term of this patent is extended or adjusted under 35 U.S.C. 154(b) by 98 days.

(21) Appl. No.: 16/871,471

(22) Filed: May 11, 2020

(65) Prior Publication Data

US 2020/0358222 A1 Nov. 12, 2020

Related U.S. Application Data

(60) Provisional application No. 62/846,075, filed on May 10, 2019.

(51) Int. Cl.
*H01R 13/53* (2006.01)
*H01R 13/62* (2006.01)
*H01R 31/06* (2006.01)

(52) U.S. Cl.
CPC ............ *H01R 13/53* (2013.01); *H01R 13/62* (2013.01); *H01R 31/06* (2013.01)

(58) Field of Classification Search
CPC ......... H01R 13/53; H01R 13/62; H01R 31/06
USPC ................................................ 439/181, 183
See application file for complete search history.

(56) References Cited

U.S. PATENT DOCUMENTS

| | | | | |
|---|---|---|---|---|
| 3,876,280 | A | 4/1975 | Jones et al. | |
| 6,042,407 | A * | 3/2000 | Scull | H01R 13/53 439/181 |
| 7,381,103 | B2 | 6/2008 | Luzzi | |
| 7,517,260 | B2 | 4/2009 | Luzzi | |
| 8,764,467 | B2 * | 7/2014 | Lee | H01R 13/53 439/181 |
| 9,124,050 | B2 | 9/2015 | Siebens | |
| 2007/0026713 | A1 * | 2/2007 | Hughes | H01R 13/53 439/181 |
| 2007/0141882 | A1 | 6/2007 | Stepniak | |

OTHER PUBLICATIONS

Thorne & Derrick International, "Elastimold Elbows—600 AMP Deadbreak Elbow Connectors"; whitepaper [online]. Nov. 21, 2017. Retrieved from <https://web.archive.org/web/20171121151124/http://www.powerandcables.com/product/product-category/elastimold-elbows-600-amp-deadbreak-elbow-connectors/>; p. 5, paragraph 3; p. 6, figure 1.

PCT/US2020/032325 International Search Report and Written Opinion dated Oct. 1, 2020.

* cited by examiner

*Primary Examiner* — Gary F Paumen
(74) *Attorney, Agent, or Firm* — Michael Best & Friedrich LLP

(57) ABSTRACT

A connector assembly includes a connector body, a first insert and a second insert. The connector body has a first opening and a second opening. The first insert includes a bore that is removably positionable within the first opening. The second insert includes a coupling portion that is removably positionable within the second opening. The coupling portion is conFIGured to engage the bore and removably secure the first insert and the second insert within the connector body.

8 Claims, 7 Drawing Sheets

DEADBREAK CONNECTOR

RELATED APPLICATIONS

This application claims the benefit of U.S. Provisional Patent Application No. 62/846,075, filed May 10, 2019, the entire content of which is hereby incorporated by reference for all that is taught.

FIELD

The present disclosure relates generally to a deadbreak connector. More particularly, the present disclosure relates to a 600-amp deadbreak connector.

BACKGROUND

As shown in FIGS. 1A and 1B, a connector 10 (e.g., a 600 amp T-body deadbreak connector) may removably receive a cable with cable adapter 20, and include a bushing 30 (e.g., a 600-amp bushing) and a plug 40 (e.g., an insulating plug). The connector 10 is designed to terminate cables (e.g., underground cables), and provide electrical connection to electrical components (e.g., transformers, sectionalizing cabinets, etc.). The connector 10 also provides a means to create modular splices.

The insulating plug 40, or another appropriate separable connector, includes a stud 50, which has a threaded outer surface. Upon inserting the cable adapter 20, the bushing 30, and the plug 40, the stud 50 is tightened in order to engage (e.g., threadedly engage) the cable adapter 20 and the bushing 30. Tightening the stud 50 substantially limits relative movement between the connector 10, the cable adapter 20, the bushing 30, and the plug 40.

The stud 50 may be tightened by first inserting the plug 40 into the connector 10, and then rotating the plug 40 by hand. This initially threads the stud 50 onto the cable adapter 20 and the plug 40. The stud 50 may then be further tightened using a tool (e.g., a wrench) in order to fully tighten the stud 50. When the stud 50 is being tightened (e.g., using the wrench), a user cannot see the stud 50, and therefore, cannot verify whether cross-threading has occurred. Accordingly, there is a need for an alternative method of tightening the cable adapter 20, the bushing 30, and the plug 40.

SUMMARY

In one embodiment, a connector assembly includes a connector body, a first insert and a second insert. The connector body has a first opening and a second opening. The first insert includes a bore that is removably positionable within the first opening. The second insert includes a coupling portion that is removably positionable within the second opening. The coupling portion is configured to engage the bore and removably secure the first insert and the second insert within the connector body.

In another embodiment, a loadbreak for use in connecting an insert with a connector assembly includes a first section and a second section. The first section includes a loadbreak assembly. The second section includes a coupling portion. The coupling portion is integrally formed with the loadbreak assembly. The coupling portion is also configured to removably secure the insert in the connector assembly.

In yet another embodiment, a method for assembling a connector assembly includes inserting a first insert including a first bore within a first opening of a connector body. The method also includes inserting a second insert including a second bore within a second opening of the connector body. The method further includes inserting a third insert including a coupling portion within a third opening of the connector body. Finally, the method includes securing the coupling portion within the first bore and the second bore.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1A:
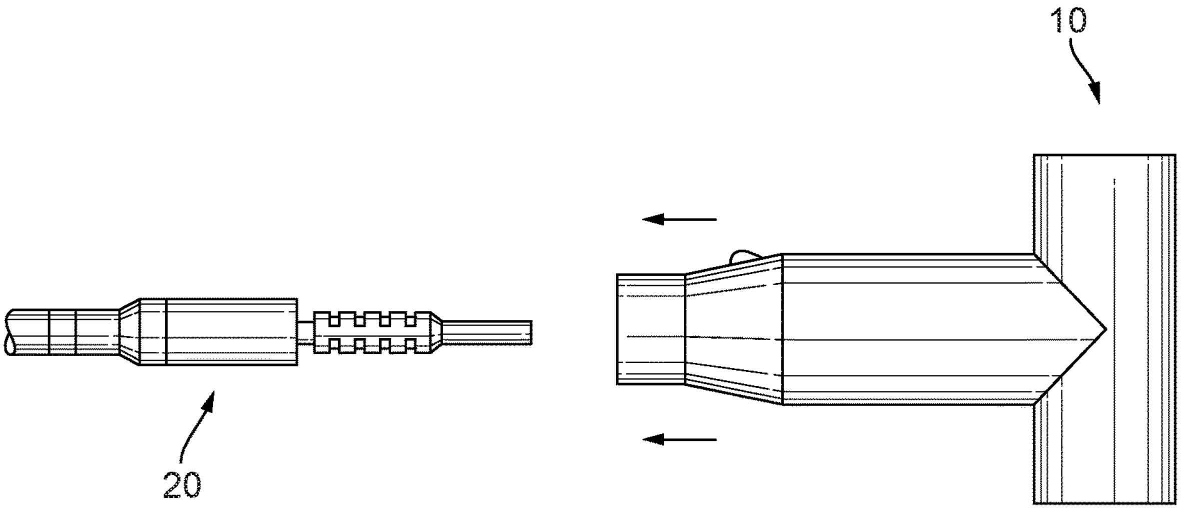
FIG. 1A PRIOR ART
FIG. 1A is a front view of the deadbreak elbow, illustrating a cable adapter coupling to the deadbreak elbow in accordance with conventional devices.
Figure 1B:
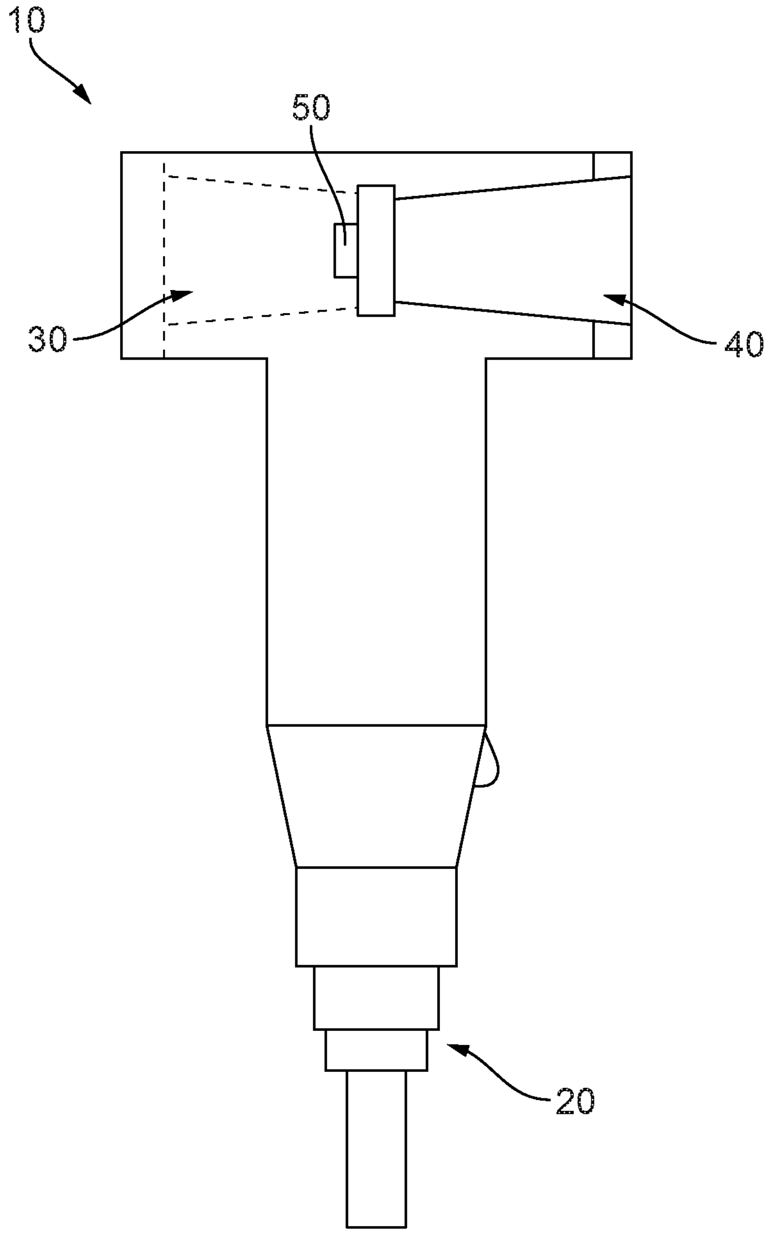
FIG. 1B PRIOR ART
FIG. 1B is a partial section view of the deadbreak elbow of FIG. 1A, coupled to the adapter, a bushing, and a plug in accordance with conventional devices.
Figure 2A:
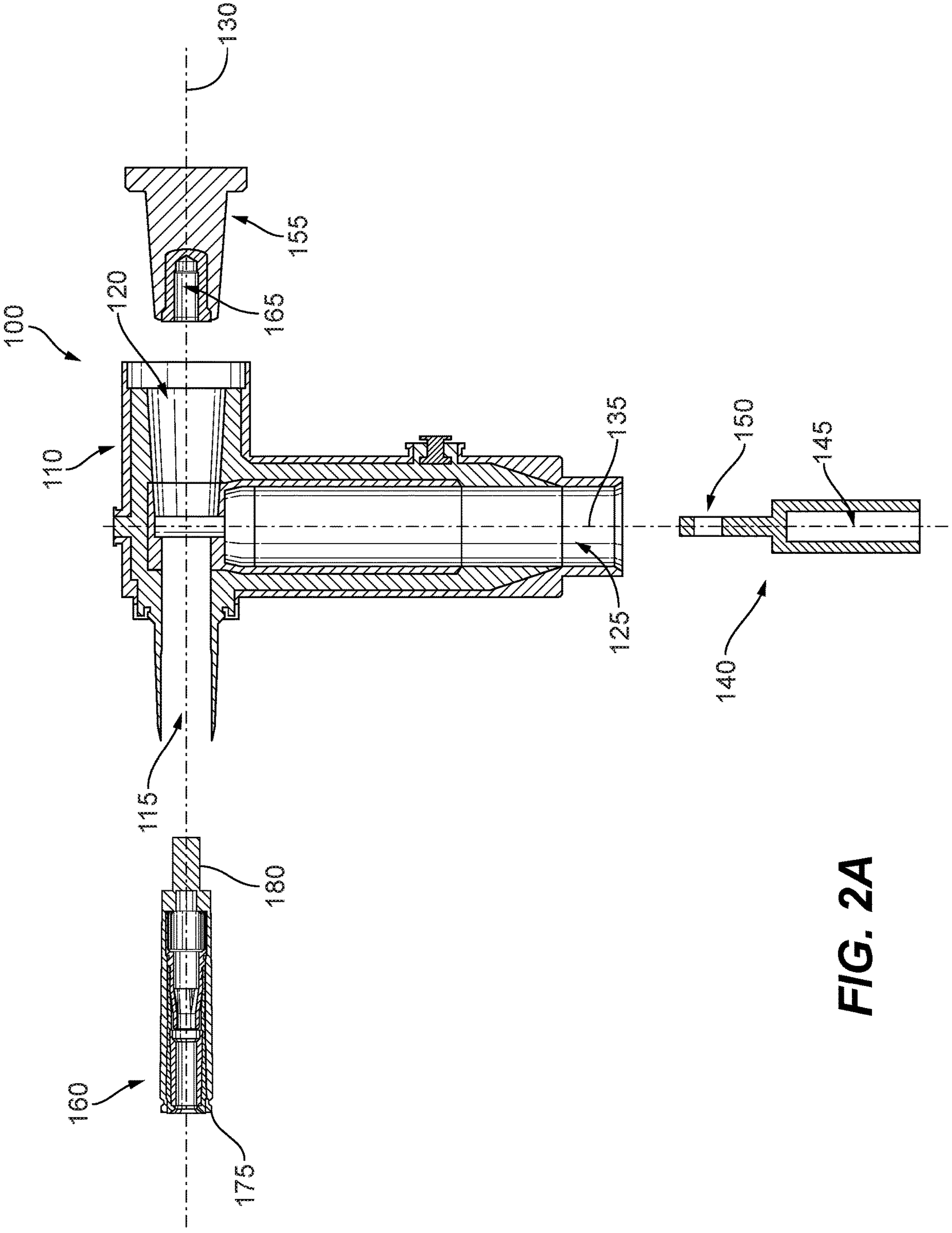
FIG. 2A is an exploded view of a connector assembly, illustrating a first assembly step according to some embodiments.

As shown in FIG. 2A, a connector assembly 100 includes a connector body 110. In the illustrated embodiment, the connector body 110 has a substantial T-shape. The connector body 110 includes a first opening 115, a second opening 120, and a third opening 125. The first opening 115 and the second opening 120 are aligned along a first axis 130. The first opening 115 may have the same or a different shape than the second opening 120. For example, the first opening 115 may be elongated when compared to the second opening 120. Additionally, the second opening 120 may be of a substantially conal shape. In some embodiments, one or more of the first opening 115 and the second opening 120 are in accordance to IEEE standard 386. For example, the first opening 115 may be a 200 A loadbreak interface according to IEEE standard 386. The third opening 125 extends along a second axis 135 which, in accordance with the embodiment illustrated, is substantially orthogonal with respect to the first axis 130. The third opening 125 may have a different shape than the first opening 115 and the second opening 120. The third opening 125 also intersects the first and second openings 115, 120. The connector body 110 may be made from a fully insulated material with a conductive outside layer.

The connector assembly 100 also includes a first insert or cable connector 140 (e.g., a 600-amp deadbreak connector). The cable connector 140 includes a bore 145 that extends partially through a length of the cable connector 140. Cables (not shown), or other electrical conductors, may be inserted into the bore 145, and coupled to the cable connector 140 (e.g., via crimping or other suitable means). The cable connector 140 also includes a through-bore or eyelet 150 opposite an opening of the bore 145. The eyelet 150 is spaced apart from the bore 145 and extends entirely through the cable connector 140 and is oriented in a direction orthogonal to the bore 145. When cable connector 140 is fully installed into the third opening 125 along axis 135 of connector body 110, eyelet 150 aligns with axis 115. In the illustrated embodiment, the cable connector 140 is made from an electrically conductive material (e.g., metal).

Figure 2B:
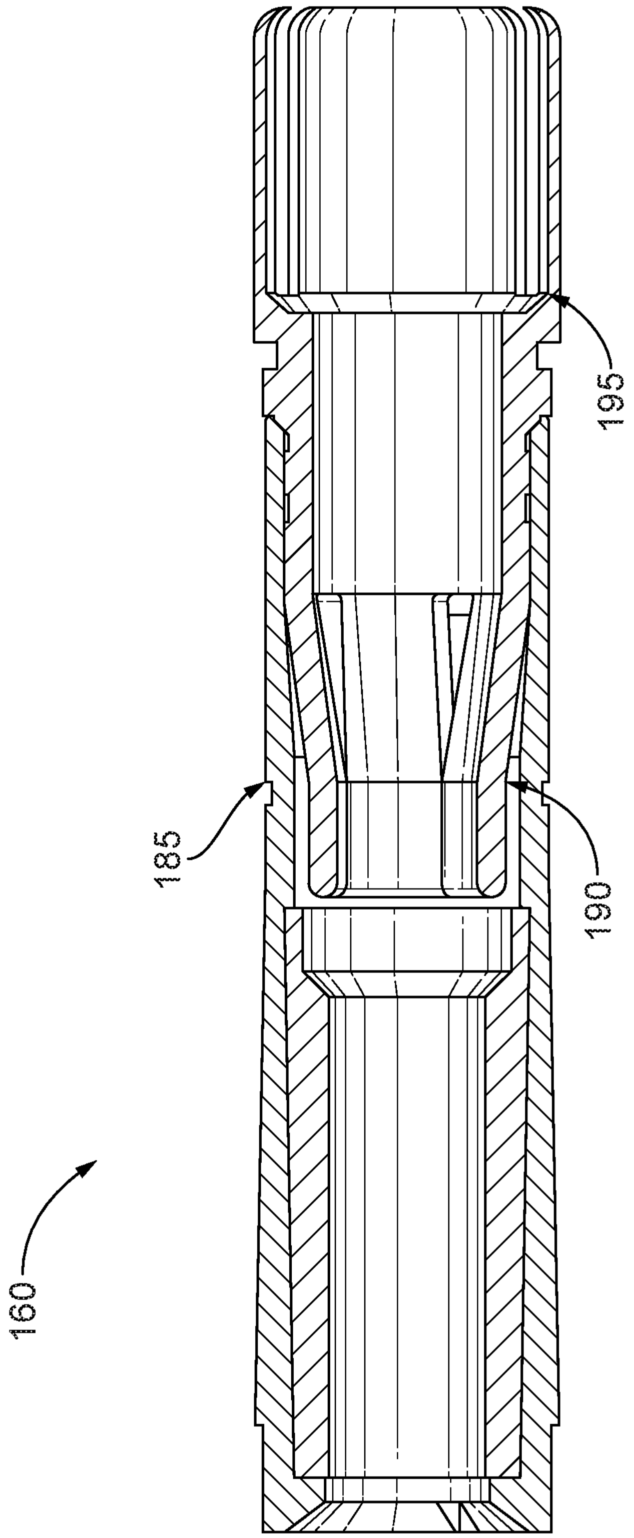
FIG. 2B is a detail view of a loadbreak connector used with the connector assembly of FIG. 2A according to some embodiments.

The connector assembly 100, in accordance with this exemplary embodiment, further includes a second insert 155, which in this exemplary embodiment is a bushing, and a third insert 160, which in this exemplary embodiment is a loadbreak connector. In some embodiments, second insert 155 is another appropriate separable connector. The bushing 155 (e.g., a 600-amp bushing) includes a generally tapered outer surface and a bushing bore 165. The bushing bore 165 is positioned proximate a narrower side of the bushing 155. In the illustrated embodiment, the bushing 155 is terminating the connection or is coupled to an electrical component (e.g., transformers, sectionalizing cabinets, etc.—not shown). The loadbreak connector 160 includes a first section 175 and a second section 180 formed integrally with the first section 175. In the illustrated embodiment, the first section 175 includes a loadbreak assembly (e.g., a 200-amp loadbreak connector). The loadbreak connector 160 may be made up of a snuffer-tube 185 with an arc-quenching material, a female contact 190, and a piston 195 (see e.g., FIG. 2B). The second section 180 is a coupling portion (e.g., a threaded portion conforming to Interface 19 of Institute of Electrical and Electronics Engineers (IEEE) standard 386). In the illustrated embodiment, the second section 180 is made from a conductive material (e.g., copper).

Prior to installation, the cable connector 140, the bushing 155, and the loadbreak connector 160 are all separate (i.e., disconnected from) the connector body 110. The openings 115, 120, 125 of the connector body 110 are, therefore, clear and unobstructed.

Figure 3:
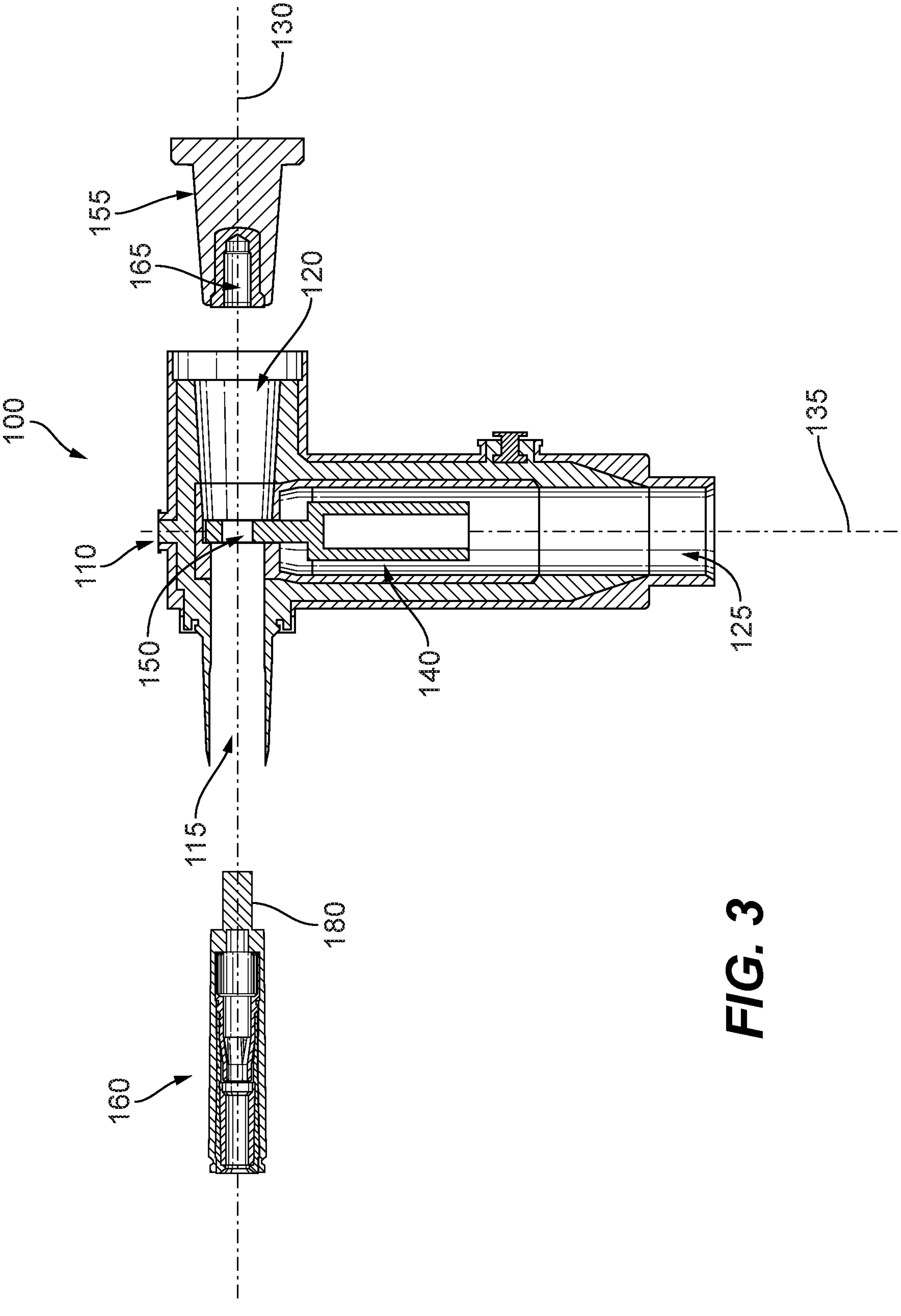
FIG. 3 is a partially exploded view of the connector assembly of FIG. 2A, illustrating a second assembly step according to some embodiments.

During installation (see e.g., FIGS. 3 and 4), the cable connector 140 (with the attached cables and cable adaptor, not shown) and the bushing 155 are coupled to the connector body 110. In the illustrated embodiment, the cable connector 140 is pushed into the third opening 125 along the second axis 135 (see e.g., FIG. 3). The cable connector 140 is pushed completely through the third opening 125 so that the first axis 130 extends orthogonally with respect to the cable connector 140 (e.g., the first axis 130 extends through a center of the eyelet 150.

Figure 4:
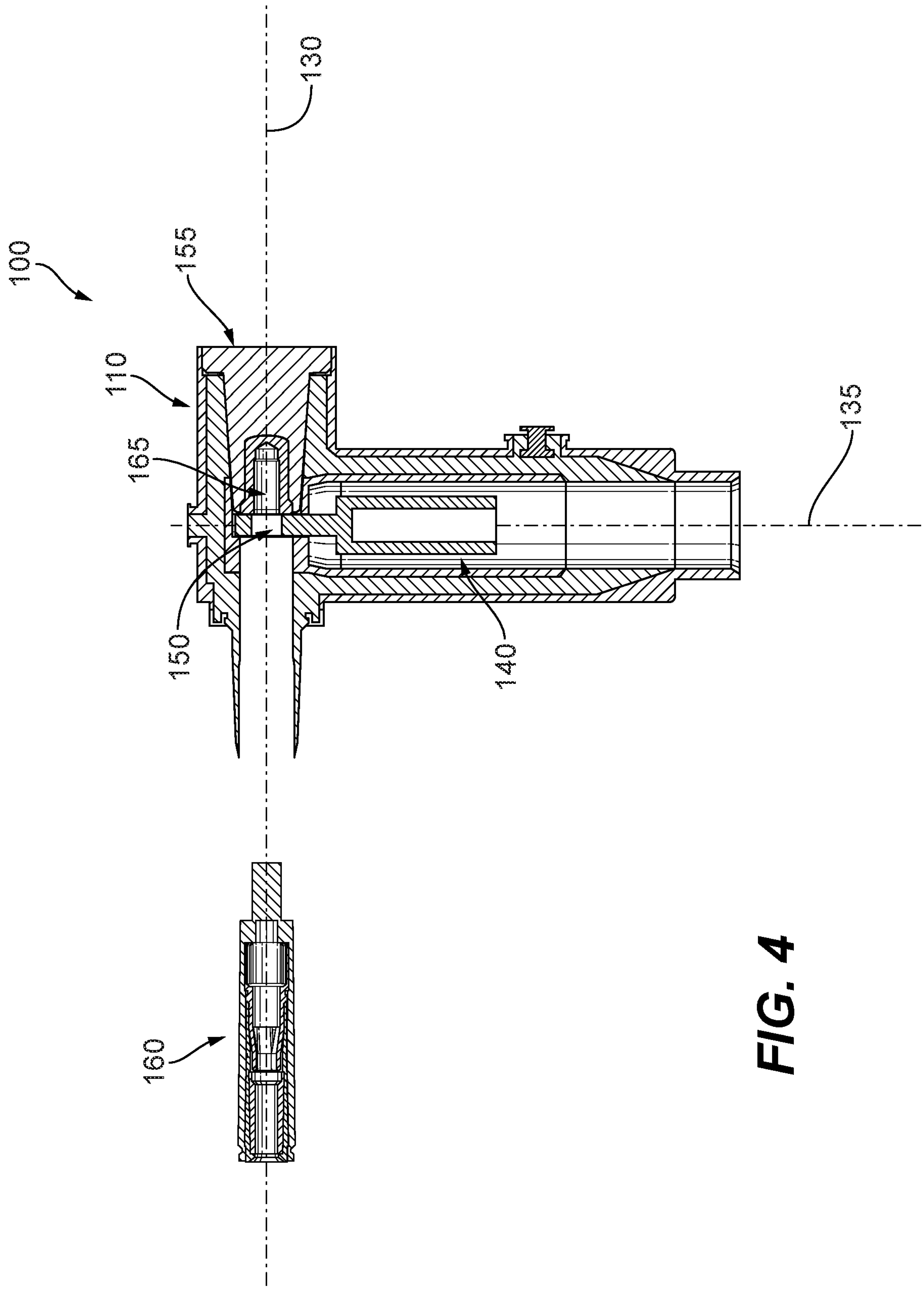
FIG. 4 is a partially exploded view of the connector assembly of FIG. 2A, illustrating a third assembly step according to some embodiments.

As shown in FIG. 4, the second opening 120 of the connector body 110 is then pushed onto the bushing 155 so that the bushing 155 is positioned proximate to the cable connector 140. In the illustrated embodiment, the bushing 155 is adjacent to the cable connector 140, and the bushing bore 165 of the bushing 155 is aligned with the eyelet 150 (e.g., the first axis 130 extends through a center of the bushing bore 165). Lubricant may be applied to the cable and cable adaptor (not shown) connected to the cable connector 140, the bushing 155, and/or the openings 120, 125 to assist in inserting the inserts (i.e., the cable connector 140 or the bushing 155, or other separable connector utilized in place of bushing 155) into the connector body 110.

Figure 5:
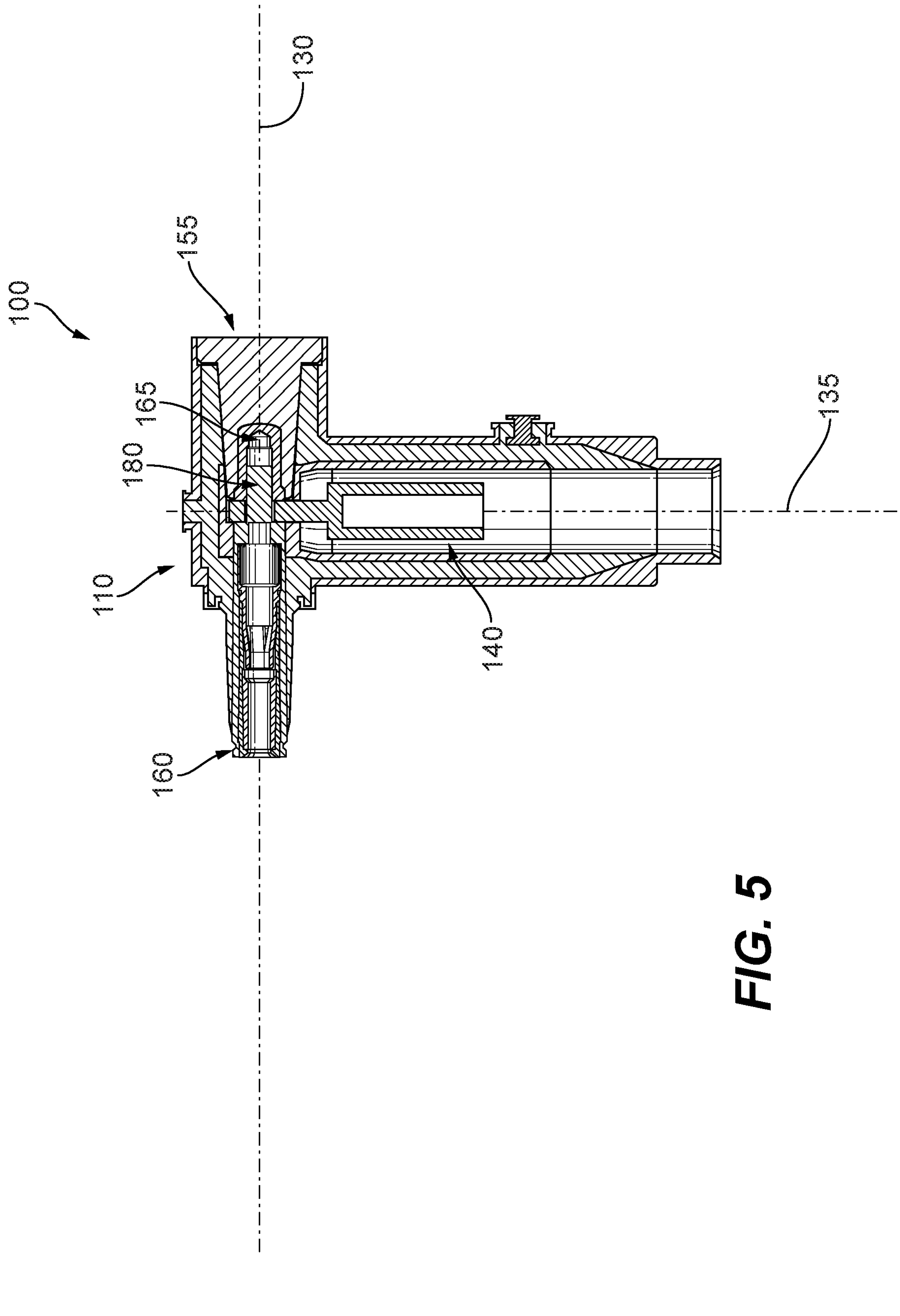
FIG. 5 is an assembled view of the connector assembly of FIG. 2A, illustrating a fourth assembly step according to some embodiments.

As shown in FIG. 5, the second section 180 of the loadbreak connector 160 is inserted into the first opening 115 of the connector body 110 to complete the installation of the connector assembly 100. The external surface of the first opening 115 includes a loadbreak interface (i.e., the first opening 115 is sized to receive a 200-amp loadbreak connector 160). The second section 180 is sized to extend through the eyelet 150 and into the bushing bore 165 of the bushing 155. The second section 180 is inserted along the first axis 130 so a center of the second section 180 aligns with centers of the eyelet 150 and the bushing bore 165. The loadbreak connector 160 is rotated as it is inserted into the first opening 115. The rotation causes the coupling portion (e.g., threads) of the second section 180 to engage the eyelet 150 and the bushing bore 165. In the illustrated embodiment, the loadbreak connector 160 is tightened with a tool (e.g., a wrench). The load break establishes an electrical and mechanical connection between the cable connector 140, the bushing 155, and the loadbreak connector 160. Connecting the loadbreak connector 160 to the connector assembly 100 allows a connection to the overall system while the system is energized.

To uninstall the cable connector 140, the bushing 155, and the loadbreak connector 160 from the connector body 110, the previous steps are performed in reverse. In other words, the loadbreak connector 160 must first be unscrewed from the eyelet 150 and the bushing 155. Then the bushing 155 and cable connector 140 may be removed from the connector body 110. In the illustrated embodiment, the system is first de-energized before the cable connector 140, the bushing 155, or the loadbreak connector 160 are disconnected.

Although aspects have been described in detail with reference to certain preferred embodiments, variations and modifications exist within the scope of one or more independent aspects as described.

What is claimed is:

1. A connector assembly comprising:

a connector body having a first opening, a second opening, and a third opening that intersects the first and second openings;

a bushing including a bore removably positionable within the second opening;

a deadbreak cable connector including a second bore removably positionable within the third opening and an electrically conducting eyelet, the second bore extending partially through a length of the deadbreak cable connector; and a loadbreak connector removably positionable within the first opening, the loadbreak connector including a threaded coupling portion integrally formed on the loadbreak connector, the threaded coupling portion is configured to threadedly engage the bore and the second bore, via the electrically conducting eyelet, such that the bushing connects to the deadbreak cable connector via the threaded coupling portion to removably secure the bushing, the deadbreak cable connector, and the loadbreak connector within the connector body.

2. The connector assembly of claim 1, wherein the connector body is made from a fully insulated material.

3. The connector assembly of claim 2, wherein the connector body includes a conductive outside layer.

4. A method for assembling a connector assembly, the method comprising:

inserting a deadbreak connector including a first bore within a third opening of a connector body and an electrically conducting eyelet, the first bore extending partially through a length of the deadbreak connector;

inserting a second insert including a second bore within a second opening of the connector body;

subsequent to inserting the deadbreak connector and the second insert, inserting a loadbreak connector including a threaded coupling portion integrally formed on the loadbreak connector within a first opening of the connector body;

rotating the loadbreak connector relative to the deadbreak connector and the second insert such that the threaded coupling portion threadedly engages the bore and the second bore, via the electrically conducting eyelet, and the bushing connects to the deadbreak cable connector via the threaded coupling portion; and securing the threaded coupling portion to the first bore and within the second bore to connect the second insert, the deadbreak connector, and the loadbreak connector within the connector body.

5. An electrical connector assembly comprising:

a connector body having a first opening, a second opening and a third opening, wherein said first and second openings are aligned along a first axis and said third opening is aligned along a second axis that is substantially perpendicular to said first axis;

a first insert including:

a first bore that aligns along the second axis and which extends partially through a length of said first insert, and an electrical conducting eyelet disposed at a first end of said first insert;

a second insert including a separable connector and having a second bore that aligns along the first axis; and a third insert that is removably positionable within the first opening and includes a threaded electrical conducting connecting portion integrally formed on the loadbreak connector that aligns along the first axis, wherein the threaded connecting portion is configured to threadedly connect to said eyelet and said second bore forming an electrical connection between said first, second, and third inserts such that the second insert connects to the first insert via the threaded connecting portion;

wherein the first insert is a 600-amp deadbreak connector and the third insert is a 200-amp loadbreak connector.

6. The connector assembly recited in claim 5, wherein said second insert is a 600-amp bushing.

7. The connector assembly recited in claim 6, wherein said eyelet and said second bore include first threads and said connecting portion includes second threads that mate with said first threads.

8. The connector assembly of claim 1, wherein the bushing does not connect to the deadbreak cable connector without the threaded coupling portion.

* * * * *